United States Patent
Dugoujon et al.

(10) Patent No.: US 8,427,994 B2
(45) Date of Patent: Apr. 23, 2013

(54) BURN-IN SYSTEM FOR MULTICAST DATA TRANSMISSION

(75) Inventors: David Dugoujon, Issy les Moulineaux (FR); Laurent Rabret, Vanves (FR); Gerard Babonneau, Thorigne Fouillard (FR)

(73) Assignee: France Telecom, Paris (FR)

( * ) Notice: Subject to any disclaimer, the term of this patent is extended or adjusted under 35 U.S.C. 154(b) by 989 days.

(21) Appl. No.: 12/162,139

(22) PCT Filed: Jan. 24, 2007

(86) PCT No.: PCT/FR2007/050685
§ 371 (c)(1),
(2), (4) Date: Dec. 22, 2008

(87) PCT Pub. No.: WO2007/085763
PCT Pub. Date: Aug. 2, 2007

(65) Prior Publication Data
US 2009/0098822 A1    Apr. 16, 2009

(30) Foreign Application Priority Data

Jan. 25, 2006  (FR) ...................................... 0650257

(51) Int. Cl.
*H04H 20/71* (2008.01)
*H04L 12/28* (2006.01)
*G06F 15/16* (2006.01)

(52) U.S. Cl.
USPC ...... 370/312; 370/390; 370/395.32; 370/474; 370/216; 709/231; 711/216; 455/3.05

(58) Field of Classification Search ................. 370/328, 370/338, 312, 432, 395.32, 395.52, 390, 370/255, 474, 395.21, 260; 711/216–221; 455/3.05, 510; 709/203, 231

See application file for complete search history.

(56) References Cited

U.S. PATENT DOCUMENTS

| | | | |
|---|---|---|---|
| 7,174,385 B2 * | 2/2007 | Li ................................. | 709/231 |
| 7,353,253 B1 * | 4/2008 | Zhao ............................. | 709/204 |
| 7,555,559 B2 * | 6/2009 | Chapweske ................... | 709/232 |
| 7,609,722 B2 * | 10/2009 | Kuskin et al. ................. | 370/471 |
| 7,729,240 B1 * | 6/2010 | Crane et al. ................... | 370/229 |
| 7,796,520 B2 * | 9/2010 | Poustchi et al. .............. | 370/236 |
| 2002/0028687 A1 * | 3/2002 | Sato et al. ..................... | 455/466 |
| 2003/0227934 A1 * | 12/2003 | White et al. .................. | 370/432 |

(Continued)

FOREIGN PATENT DOCUMENTS

| | | |
|---|---|---|
| EP | 1 365 538 | 11/2003 |
| WO | 2005 078999 | 8/2005 |

OTHER PUBLICATIONS

Chapweske J et al: "Tree Hash EXchange format (THEX)", pp. 1-5, XP002283758. (2003).

*Primary Examiner* — Kwang B Yao
*Assistant Examiner* — Candal Elpenord
(74) *Attorney, Agent, or Firm* — David D. Brush; Westman, Champlin & Kelly, P.A.

(57) ABSTRACT

A system for improving the reliability of transmission of multibroadcast data between a source of data and a plurality of customer receivers of the data via a telecommunications network. The system includes a supervision server adapted to provide each customer receiver with a list of at least one other receiver, said customer receiver being adapted to receive missing data from said the other customer receiver via a reliable peer-to-peer connection.

13 Claims, 3 Drawing Sheets

U.S. PATENT DOCUMENTS

| | | | |
|---|---|---|---|
| 2004/0236683 A1* | 11/2004 | Guermonprez et al. | 705/40 |
| 2004/0236863 A1* | 11/2004 | Shen et al. | 709/231 |
| 2007/0064718 A1* | 3/2007 | Ekl et al. | 370/432 |
| 2007/0248226 A1* | 10/2007 | Chong et al. | 380/200 |
| 2008/0100694 A1* | 5/2008 | Barkley et al. | 348/14.08 |
| 2009/0006853 A1* | 1/2009 | Li | 713/176 |
| 2009/0259847 A1* | 10/2009 | Li | 713/168 |
| 2010/0110935 A1* | 5/2010 | Tamassia et al. | 370/256 |

* cited by examiner

```
|_____Seq_Num_____|_Type_|_Data...__
|  1     2     3     4    5      6
```

Fig.3

| Number of packet sent | Content of packet |
|---|---|
| 1 | 00000001-06-<HS6 1>-<HS6 2> |
| 2 | 00000002-05-<HS5 1>-<HS5 2>-<HS5 3>-<HS5 4> |
| 3 | 00000003-04-<HS4 1>-<HS4 2>-...-<HS4 7>-<HS4 8> |
| 4 | 00000004-03-<HS3 1>-<HS3 2>-...-<HS3 17>-<HS3 16> |
| 5 | 00000005-02-<HS2 1>-<HS2 2>-...-<HS2 17>-<HS3 32> |
| 6 | 00000006-01-<HS1 1>-<HS1 2>-...-<HS1 17>-<HS1 37> |
| 7 | 00000007-01-<HS1 38>-<HS1 39>-...-<HS1 64>-<HS1 64> |

Fig.4

| Number of packet sent | Content of packet |
|---|---|
| 8 | 00000008-00-A142B................40 |
| 9 | 00000009-00-2F753................BC |
| 10 | 0000000A-00-DD213................8A |
| 11 | 0000000B-00-7E5E8................55 |
| 12 | 0000000C-00-45602................D9 |

Fig.5

BURN-IN SYSTEM FOR MULTICAST DATA TRANSMISSION

The present invention relates to a system for improving the reliability of transmission of multibroadcast data between a source of said data and a plurality of receivers of said data via a telecommunications network.

The invention finds one particularly advantageous application in the field of transmission of data in multibroadcast mode, also known as "multicast" mode.

The terms "multibroadcast" and "multicast" are used interchangeably in the remainder of the description, the term "multicast" being widely used in this field.

Close control of the efficient bulk distribution of data is crucial for Internet Service Providers (ISP for Internet Service Provider). The current trend is to supply and to administer remotely network equipment installed in the home in the form of home gateways and set-top boxes (STB). The equipment installed in the home is referred to below as the "receiver" or the "customer".

There are therefore potentially millions of receivers that must be administered from one or a few points controlled by the ISP. It is also increasingly obvious that viruses are continuing to spread and now affect not only personal computers but everything relating to communicating applications based on electronic data processing using equipment such as personal digital assistants (PDA), mobile telephones, and the above-mentioned home gateways and STBs. Writers of viruses and other malware are increasingly skilful and the time delays between security failings going public and viruses being developed to exploit them are continually decreasing.

It is therefore becoming vital to be able to master technologies for updating all domestic receivers administered by the operator very quickly. The reliability of the equipment and the quality of service depend on this, which must be achieved by fast and efficient updating solutions in the homes of very large numbers of customers.

A first method of solving this problem is to use a raft of content servers, distributed or not. That solution can be very costly, however, because it requires considerable resources in terms of the number of servers and considerable network resources. Also, to achieve an acceptable compromise, server administrators often use a policy of spreading the task in time by performing a given maximum number of daily updates. That strategy is beneficial in that it limits the growth of calls to telephone helplines ("hotlines"), software updates often leading to additional calls, but it is totally unsuitable for deploying a security module urgently, for example.

A second method is a multibroadcast or "multicast" method that constitutes simple and efficient means for a data source to reach any group of receivers, from a few to several million, very quickly, but that solution is based on the UDP (User Datagram Protocol) and offers no guarantee of correct transmission of data to customers, and some data can be lost at the connection or router level, for example. That drawback is aggravated by the absence of a return channel, which would enable recovery of missing data. Administering any such systems with very large numbers of receivers would be problematic.

However, the IETF group RMT (Reliable Multicast Transport) has looked at this problem of improving the reliability of multicast transmission, and proposes a set of solutions that can be classified into two major categories:

FEC (forward error correction) solutions based on adding redundant information for calculating the lost or missing information if the quantity of information is limited; one particular example of redundancy is cyclic broadcasting without FEC of all data intended for the customer group;

solutions based on close control information fed back by customers in the event of losses to request packets lost by at least one user, which are then transmitted to the whole of the group; special mechanisms are then necessary to prevent overloading of the network in the terminal to server direction, which could be related to a DDoS (distributed denial of service) attack, with the risk of blocking a set of services.

Conjoint use of those two techniques optimizes transfers over the network, but the problem relating to DDoS-type attacks persists if the application needs a list of receivers that receive the file correctly.

To summarize, methods of improving the reliability of multicast data transmission have the following limitations.

With the raft of servers method, it is found that if a very large number of receivers are administered by a central site, that site can accept only a limited number of simultaneous requests, depending on its internal resources. Such requests are based on point-to-point sessions, in particular TCP sessions. To authorize simultaneous administration of a large number of receivers, the data source is obliged to install a set of machines to distribute requests. Those solutions are generally costly and complex to administer to achieve a good load distribution.

Turning to reliable multicast transmission, it is found that:

although FEC-based solutions reach all receivers from a single source, they are very sensitive to bursty losses, as encountered primarily in the end networks, and therefore cannot ensure that data is always received reliably; furthermore, not all terminals are active simultaneously, and it is sometimes necessary to transmit data files periodically;

solutions based on sending back acknowledgements can manage very large groups of receivers only on condition that the quantity of information fed back to the source is limited; this point is characterized by the concern to limit "NAK implosion" phenomena, where NAK denotes a negative acknowledgement sent only on detecting loss of data packets; most solutions of that type rely on multicast transmission not only from the source to the receivers, but also for all messages sent by each of the receivers that must be included in the same session as the source; that is a multicast mode referred to as the "N –>N" mode to distinguish it from a "1–>N" multibroadcast session; the source competing with its receivers to send data then becomes a problem for a number of reasons:

sending data in datagram mode provides no control over the available bit rate, in contrast to the TCP, in which control nevertheless remains very difficult, if not impossible, in a session addressing a heterogeneous installed receiver base; transmission from too many receivers can saturate the network connections, reflected in losses that generate additional transmission by the receivers, aggravating the congestion situation;

many networks are incompatible with an "N–>N" mode of operation; moreover, many operators intentionally limit their network to the "1–>N" mode to maintain control and to prevent uncontrolled congestion that could be related DDoS-type attacks.

Thus the technical problem to be solved by the subject matter of the present invention is to propose a system for improving the reliability of transmission of multibroadcast data between a source of data and a plurality of receivers of said data via a telecommunications network that would make it possible to transmit data reliably, i.e. to be able to remedy any losses and guarantee the integrity of the recovered data, that is economic in terms of network cost and distribution server cost, that offers high performance, namely fast deployment to millions of customers, and that is free of any mass feedback mechanism.

The solution according to the present invention to the stated technical problem is that said system comprises a supervision server adapted to provide each customer receiver with a list consisting of at least one other customer receiver, said customer receiver being able to receive missing data from said other customer receiver via a reliable peer to peer connection.

Here the peer to peer connection concept refers to the family of protocols that have recently been introduced based on "Peer to Peer" (P2P) exchanges. The novelty of a peer to peer network is that terminals behave at the same time as customers, consuming resources, and as servers, providing resources. For example, the best data file sharing P2P protocols use swarming methods, whereby a file is divided into a number of portions, enabling it to be downloaded from a number of source terminals, which optimizes load sharing, speed, and robustness.

Thus the invention uses the conventional multibroadcast mechanism, in which a multicast source is responsible for broadcasting data, a file for example, to a group of customer receivers of the network of an operator by means of ad hoc protocols. Given the non-reliability of the transport layers supported by the multicast packets, UDP in particular, it is possible for data to be lost in the network. To solve this problem, the invention proposes to use a peer to peer network approach. Each customer receiver is connected to certain of its peers by a reliable connection, such as a TCP/IP connection, which is maintained throughout the session. If a receiver detects that a data packet has been lost, it contacts a peer to recover the packet in question.

To summarize, the invention combines two technologies to optimize transmission of data: the multicast technology enables downloading to a very large number of customers, while P2P connection avoids feeding a large number of error messages from customers back to a single source.

In a second aspect the invention provides a source of data multibroadcast to a plurality of customer receivers of said data via a telecommunications network, said source of data being adapted to transmit to said customer receivers, before the data, the root hash HR of a Merkle hash tree of said data by reliable multibroadcasting via said telecommunications network, said source of data being adapted to transmit to customer receivers hashes of lower level than said root hash HR, after said root hash and before said data, a customer receiver being adapted to receive missing data from another customer receiver via a reliable peer-to-peer connection.

In a third aspect the invention provides a supervision server for a system for improving the reliability of transmission of multicast data between a source of data and a plurality of customer receivers of said data via a telecommunications network, said supervision server being adapted to provide each customer receiver with a list of at least one other customer receiver, said list being intended to establish a reliable peer-to-peer connection between said customer receiver and said other customer receiver.

In a fourth aspect the invention provides a reference source for a system for improving the reliability of transmission of multicast data between a source of data and a plurality of customer receivers of said data via a telecommunications network (1), said reference source (40) having said data and being adapted to establish a reliable peer-to-peer connection with at least one customer receiver.

Thus if data packets for all receivers were to be lost, those receivers having the reference source in the list supplied by the supervision server can then establish a peer to peer connection with said reference source and recover said lost packets, such recovery being propagated to the other receivers by the mechanism of the peer to peer connection between receivers.

In a fifth aspect the invention provides a customer receiver in a system for improving the reliability of transmission of multicast data between a source of data and a plurality of customer receivers of said data via a telecommunications network, said customer receiver comprising means for verifying the integrity of the data provided by said other customer receiver during a peer-to-peer connection.

Thus when a receiver recovers data from another receiver from its list, it can be sure that the data received corresponds to the data expected.

According to preferred non-limiting embodiments, the fifth aspect of the invention has the following additional features, separately or in combination:

The verification means comprise means for calculating hashes of fragments of data received from at least one other customer receiver and means for comparing the calculated hashes with hashes of said fragments received from said source of data.

The customer receiver includes means for verifying the integrity of hashes provided by said other customer receiver during a peer-to-peer connection.

Hashes received from the source are generally transmitted over a multicast connection that has not been made reliable, and so can be lost and then recovered by a receiver via peers from its list, in the same way as other data. Thus the hash integrity verification means are used to verify the information provided by the other customer receiver.

The hash integrity verification means use a Merkle hash tree.

In a sixth aspect the invention provides a method of transmitting multicast data between a source and a plurality of customer receivers via a telecommunications network, said method including transmission of missing data by a customer receiver to another customer receiver via a reliable peer-to-peer connection.

In a seventh aspect the invention provides a method of receiving data multicast between a source and a plurality of customer receivers ($20_1$, $20_2$, . . . , $20_N$) via a telecommunications network, including reception of missing data by a customer receiver from at least one other customer receiver via a reliable peer-to-peer connection.

In a eighth aspect the invention provides a computer program on a data medium that can be loaded into the internal memory of a computer, said program comprising code portions for executing steps of the method constituting the sixth aspect of the invention.

In a ninth aspect the invention provides a computer program on a data medium that can be loaded into the internal memory of a computer, said program comprising code portions for executing steps of the method constituting the seventh aspect of the invention.

The following description with reference to the appended drawings, which are provided by way of non-limiting example, explains clearly in what the invention consists and how it can be reduced to practice.

FIG. 3 represents a packet format for transmission of data from the multicast source to the receivers;

Figure 6:
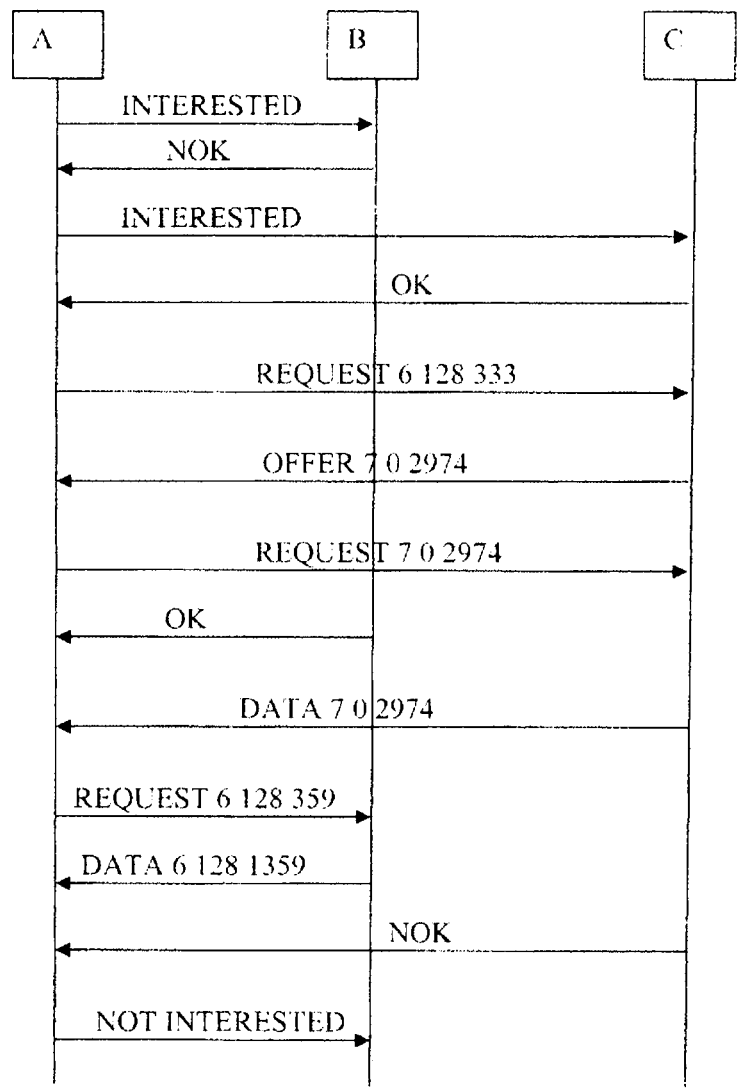

FIG. 4 gives an example of hash packets transmitted by the multicast source to the receivers;

FIG. 5 gives an example of data packets transmitted by the multicast source to the receivers;

FIG. 6 is a diagram of a data recovery session between a receiver and two of its peers.

Figure 1:
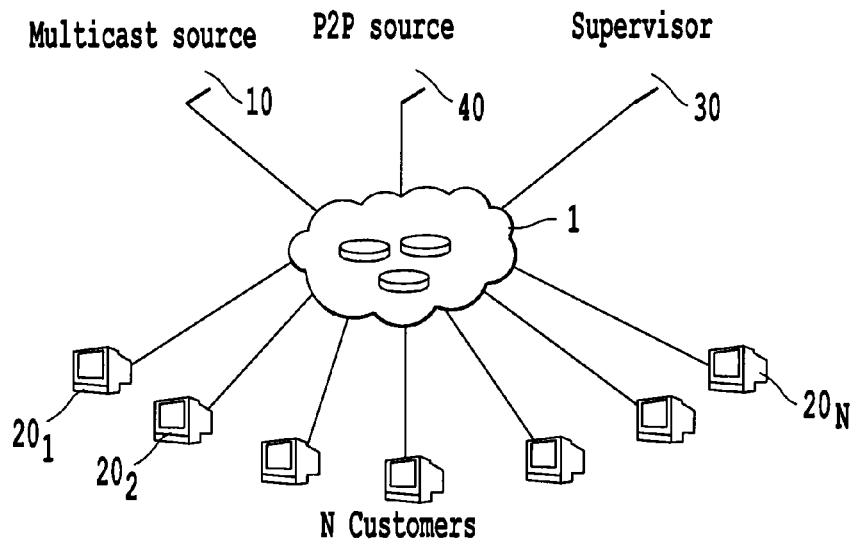
FIG. 1 is a diagram of a system of the invention for improving the reliability of multicast data transmission.

FIG. 1 represents a system for improving the reliability of transmission of multibroadcast data between a multicast source 10 and N customer receivers $20_1, 20_2, \ldots, 20_N$ via a telecommunications network 1. Data is transmitted in the network 1 using the User Datagram Protocol (UDP), for example, which is a priori unreliable, but which can be made reliable by the methods referred to above. However, the invention seeks to avoid systematic recourse to those methods, given their disadvantages with multicast transmission of a large amount of data to a large number of receivers.

The FIG. 1 system includes a supervision server 30 responsible in particular for connecting the various customer receivers with a view to establishing a reliable peer-to-peer connection between them afterwards. For this purpose, when a customer is registered the supervision server 30 provides a list of at most N−1 other peers already registered and with which reliable TCP/IP connections can be established during sessions for recovering missing data.

Said supervision server 30 and the multicast source 10 can constitute one and the same machine.

The first customers will not obtain N−1 peers, of course, which is not a problem because they will be contacted by new customers as and when their number increases.

It is important to note that the supervision server 30 must choose carefully the peers associated with a given receiver. Choosing only peers that are nearby in the topological sense would make error recovery impossible in the event of a problem caused by the network core, for example by rerouting. Conversely, choosing only distant peers could burden network traffic without benefit and reduce the efficiency of the system. Furthermore, a random choice of peers from all peers involved seems beneficial from the robustness point of view but of moderate efficiency in terms of traffic optimization. For the purposes of optimization, it would therefore appear preferable for the server 30 to provide a list of near and distant peers.

As shown in FIG. 1, the system of the invention also includes a reference source 40 that has all the data to be transmitted and appears in at least one list of peers provided by the server 30, so as to be able to retransmit missing data to the associated peers requesting this, if necessary. In fact, the reference source 40 is a customer that already has the whole file and is therefore not participating in the multicast session. In contrast, it contributes to making deployment more reliable by supplying missing packets to customers to which it is connected. This can be very useful in the event of packet loss at the upstream end, close to the source 10.

The reference source 40 can also be located on one and the same machine as the source 10 and the supervision server 30.

Before continuing the description of the reliability improvement system of the invention, it is necessary to summarize the structure of a data file.

A data file consists of one or more "blocks" of data, depending on the requirements of the application. The blocks are managed by the application itself and not by the protocol.

A block consists of a number of fragments. The integrity of the content exchanged between peers is verified relative to these fragments.

A fragment consists of a number of segments, which are encapsulated in UDP packets, for example.

During a deployment session, the file to be transferred is sent by the source 10 in the form of segments inside UDP packets. In the event of loss, the missing segment or each of the missing segments is recovered in P2P mode. It is then necessary to provide a mechanism that can guarantee the integrity of the data downloaded from a third-party customer that is not necessarily trustworthy, and to do this in a relatively short time.

There are a number of methods for solving this problem. Each sends securely beforehand a signature enabling customers to certify the received data.

One simple solution is to supply a hash of a file. This method has limitations because it obliges the receiver to verify the integrity of the file only when it has been completely downloaded. Moreover, if the receiver has been obliged to recover data segments from a number of peers, one of which was malicious, the receiver finds itself unable to identify the malicious peer and the suspect data segments.

Another solution calculates hashes over fragments of the file. As a result, as soon as a customer assembles a fragment from a number of segments, they can verify its integrity and therefore react more promptly to a malicious attack. This is the method currently used in the BitTorrent P2P protocol (http://www.bittorrent.com). The weakness of this approach is that all the hashes of the fragments of a file must be supplied by the source 10 in a secure manner. This data can become somewhat voluminous, depending on the chosen size of the fragments (up to a few megabytes), and transporting it may represent a penalty in the event of sending to millions of customers.

The preferred solution of the invention uses a Merkle hash tree (R. Merkle, "Secrecy, Authentication and Public Key Systems", PhD Dissertation, Dept. of Electrical Engineering, Stanford Univ., 1979). This solution, shown in FIG. 2, calculates level 1 hashes HS11, HS12, . . . , HS16 over the six fragments of the file and recursively calculates level 2 hashes HS21, HS22, HS23 on the previous hashes HS11, etc. taken two by two until a root hash HR is obtained. This solution leads to extra calculation relative to the previous solution, but enables the source 10 to transmit reliably only the root hash HR. This considerably reduces the quantity of data to be sent in advance of deployment and in an entirely reliable way, to approximately one hundred bytes all inclusive, for example.

This information concerning the root hash HR of the Merkle tree of the data file to be transmitted is part of information that the multicast source 10 must group together in a metafile in order for it to be distributed in a reliable, integrated, and secure manner to all the receivers $20_1, \ldots, 20_N$ that have to participate in the data transmission session. How this metafile is supplied to the customers is not part of the invention. This can be achieved without difficulty by sending periodically or by using the HTTP, HTTPS, FTP, SCP protocols, for example.

In addition to the root hash HR of the Merkle tree, said metafile can also contain:
 the IP address of the source;
 the IP address of the multicast stream;
 the scheduled transmission date and GMT time;
 the name of the data file;
 the size of the file;
 the size in bytes of the data fragments used to generate the Merkle hash tree;
 optionally, a list containing all the information on the blocks:
  the block number;

the block size;

the offset of the beginning of the block in the file;

optionally, a chosen strategy for dialogue with peers.

This produces a metafile of a few hundred bytes to be distributed before deploying the data. Note that a certificate can be associated with it to guarantee its authenticity.

The metafile and all the other data or information sent by the multicast source 10 to the receivers are sent in packets with the format represented in FIG. 3.

The first four bytes "Seq Num" are reserved for the sequence number of the packet. By analyzing the sequence numbers received, a receiver can detect the loss of one or more packets. The sequence number depends only on the order in which the data packets are sent. It is incremented each time that a multicast packet is sent.

The next byte "type" characterizes the type of information sent in the packet:

the value 00 corresponds to a data packet as such;

the value 01 corresponds to a packet containing level 1 hashes;

the value 02 corresponds to a packet containing level 2 hashes; and so on.

The bytes that follow the "type" field correspond to the payload data, whether that consists of hashes or of data from the file to be transmitted, as represented in FIGS. 4 and 5, respectively.

After reliably transmitting the root hash HR of the Merkle tree of the data file to the receivers, and before deployment as such, the multicast source 10 sends all the customers all the hashes necessary for verifying the integrity of data that might be recovered subsequently in the event of loss of packets. It must be remembered that the segments, or data packets, sent by the source are deemed to be integral by the customers.

Figure 2:
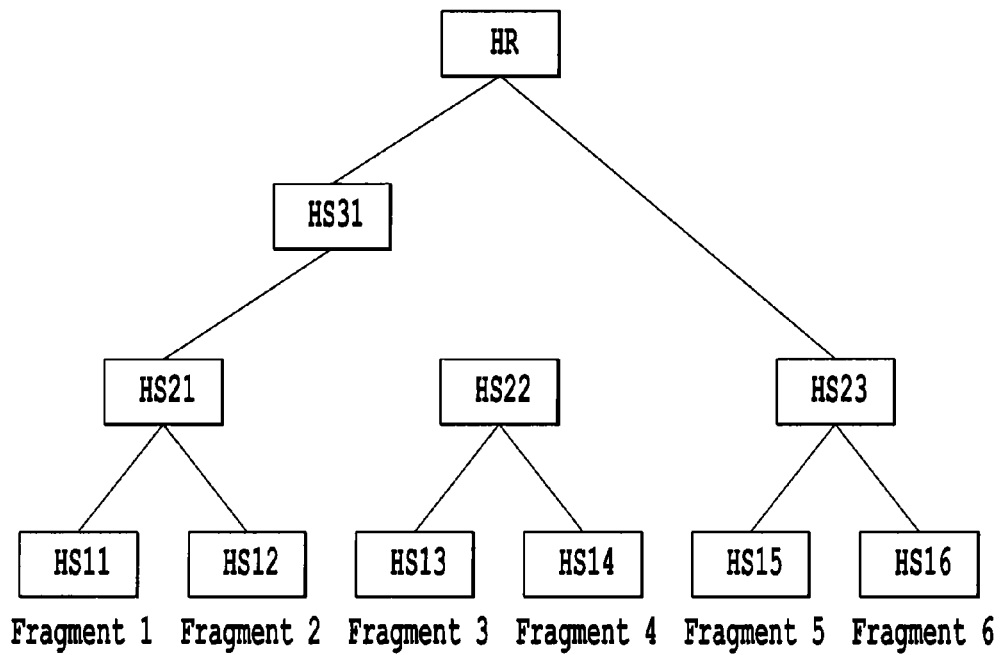
FIG. 2 represents a Merkle hash tree used in the invention.

FIG. 4 shows one example of packets corresponding to this sending. The source 10 initially sends the hashes of immediate lower level than the root hash HR. In the example shown, the root is of level 7, and the first packet sent is therefore of type 06 and contains hashes of level 6, namely HS61 and HS62. The second packet contains hashes of level 5, and so on up to hashes of level 1, which are the hashes of all the file fragments, as shown in FIG. 2.

In this way, if a packet of hashes is lost, it can be recovered from a peer and its integrity verified on the basis of the higher level hashes. This is valid even in the event of loss of the first packet because the verification is then effected by the root hash HR of the Merkle tree, which is part of the information contained in the metafile sent reliably and integrally beforehand. It is also true for the loss of the first data packet of type 00, because the offset can be calculated a posteriori.

Note that the packets are constructed so as to send at most only one level per packet and to send only entire hashes in each packet. This is possible because the packets sent in multicast mode constitute what is known as a "packet boundary", i.e. the customer software can monitor the size of each packet transmitted over the network. It is therefore possible to transmit packets of hashes of varying size.

The multicast source 10 then sends 00 type packets containing the data with the format represented in FIG. 5. The first packet of this type is used to calculate the offset between the sequence number (Seq Num) and the position of the payload data. To this end, all data packets of the file to be deployed, except for the last, must be the same size. This information makes it possible to reconstitute the file if lost.

The sequence numbers of the packets thus enable a receiver to detect losses of data sent by the source and to effect a repair via its peers. It must be possible to detect losses during a transfer or when a transfer is interrupted, for whatever reason. A number of situations are possible, in which a distinction must be drawn between the source halting transfer and losses in the transmission network.

1. At the end of transmitting a file, the source sends an END message that contains a field indicating the sequence number of the last segment sent. This message is sent several times to guarantee its reliable reception in the event of losses in the network. On receipt of this message, a receiver can easily identify if packets have been lost and then effect a repair.

2. In the event of temporary halting of transmission by the source, the source must send a PAUSE message containing the sequence number of the last packet sent. The receiver can effect a repair in a similar way to the previous situation.

3. In the event of prolonged halting of reception of data with no END or PAUSE message, a time-out is triggered before concluding that transmission has been broken off. The receiver can then attempt to launch a repair if it can contact its peers, depending on the location of the break in the network.

4. End of transmission detection by analyzing the size of the file received is also possible. The size of the file to be transmitted is in fact a parameter of the information metafile supplied initially by the multicast source.

The mechanism of dialogue between peers during recovery of missing data by a receiver is described in detail below.

Connection to a peer is always requested by providing the Merkle root hash HR, which unambiguously identifies the data file that is the subject matter of the deployment. It is nevertheless possible to envisage other identification means, such as the file name or a file identifier. Supplying the identifier enables receivers to distinguish between and identify sessions.

Given that the environment of the peers concerned is not necessarily cooperative, it may be preferable to institute a "tit-for-tat" policy of contact between peers.

In this context, each customer peer must limit its number of simultaneous transmissions to other peers and give priority to those most generous toward them. The selection criteria are:

Highest priority: give priority to peers in the process of transmitting data with the highest bit rates;

Otherwise, give priority to peers that have supplied the most data;

If neither of the above situations applies, choose peer(s) at random or as a function of topological information, as described above.

However, in multicast mode, a receiver has never tested exchanges with its peers at the time it decides to initialize a repair. It does not know a priori which are the best peers.

When a receiver has detected a loss of data, it must decide to start the repair process. An important aspect of operation is optimizing requests to peers. The particular feature of multicast transmission is that in some circumstances all customers detect an end of fragment or block at the same time and are therefore led to initiate the recovery procedure quasi-simultaneously if they detect loss of data. Consequently, the exchange specification must avoid a profusion of messages triggered by these events in order to limit the risk of congestion of the network by bursts of traffic. A number of situations are possible:

1. The receiver waits for the end of a block, a fragment or the file, indicated by a PAUSE message, for example, to initialize a repair via its peers. The requests can contain a list of lost segments or lost ranges of segments. Each receiver triggers a pseudo-random time-delay in a predefined window, which can be a additional field in the metafile. Thus requests are distributed over a limited time to smooth the network load.

Immediately the complementary data is received, each receiver verifies the integrity of the fragment by means of information from the hashes.

2. The receiver initializes a repair as soon as it has detected loss of an isolated packet or a range of packets, without awaiting a PAUSE message. It triggers a time-delay as above before sending a request message (REQUEST) defined below.

The choice of one or the other of these solutions is a function of the application, the error rate, and the distribution of errors.

Table 1 below defines all instructions for signaling between peers used in the missing data recovery protocol.

TABLE 1

| Message | Parameters | Description |
| --- | --- | --- |
| INTERESTED | None | Notifies a peer of a data downloading request |
| NOT INTERESTED | None | Notifies a peer of the end of a data downloading request |
| REQUEST | Sequence number(s) of first lost segment. Size (in bytes; can exceed the size of the segment). | Sent by the customer. Requests downloading of data that can be spread over a number of segments. |
| OFFER | Sequence number(s) of first lost segment. Size. | Response sent by a peer if it has only some of the data requested by the customer. The customer must send an appropriate REQUEST message. |
| DATA | Segment sequence number. Size Data | Response sent by the peer with the data required by the customer. |
| CANCEL | Segment sequence number. Size. | Cancels a REQUEST message. |
| OK | None. | Following an INTERESTED message, notifies that the peer accepts that the customer is submitting REQUEST messages (can eliminate an NOK message) |
| NOK | None. | Following an INTERESTED message, notifies that the peer is refusing the REQUEST messages from the customer. |

FIG. 6 shows one example of an exchange session between peers A, B, C using signaling messages from Table 1.

There are two strategies for organizing downloading between peers:

- The first approach interrogates its own peers blind. This economizes on the number of messages sent and is the optimum in a network with a low loss rate and in which it is not necessary for missing packets to arrive quickly. Each customer has no idea of the packets received by its peers and therefore interrogates them sequentially until the data they want is obtained.
- The second approach notifies peers of the fragments that the customer has available as soon as a fragment is received. For this purpose, it is necessary to introduce two new messages, defined in Table 2 below.

TABLE 2

| Message | Parameters | Description |
| --- | --- | --- |
| HAVE | Bit fields or 0 if no data | 0 corresponds to a missing fragment, 1 corresponds to a fragment that is present |
| RECEIVED | Fragment number | Notifies a fragment reception peer |

When a fragment is completed, the customer must verify its integrity using the Merkle hash tree if some data does not come from the multicast source. It can then supply that data to its peers afterwards.

Multicast (UDP/IP) transmission is highly sensitive to congestion in the network because there is no simple way to regulate the output bit rate of the source, which is generally constant. It is therefore important that retransmission anywhere in the network is never an obstacle to the transfer of multicast packets. This behavior is natural in an IP network, as the TCP traffic leaves room for UDP. If the UDP bit rate is very close to the maximum bit rate authorized on a link, the only risk is the slowness of the repair.

If retransmission were to cause congestion, it would then be necessary to wait for the end of transmission to initialize the repair process. The means described above remain unchanged.

The invention also provides for the root of the Merkle hash tree to be transmitted to the receivers before the data.

This root can be transmitted by any means, preferably reliable means. In particular, the data source is adapted to transmit the root of said Merkle hash tree to the receivers before the data by reliable multibroadcasting over said telecommunications network. Other transmission means can be envisaged, of course, such as a web page or electronic mail.

Similarly, according to the invention, said data source is adapted to transmit hashes of lower level than said root to the receivers after said root and before the data.

The invention also relates to a source of data multibroadcast to a plurality of receivers of said data via a telecommunications network, noteworthy in that the data source is able to transmit the root of a Merkle hash tree of the data to the receivers before the data by reliable multibroadcasting over said telecommunications network.

Moreover, said data source is able to transmit hashes of lower level than said root to the receivers after said root and before said data.

The invention further relates to a supervision server for a system for improving the reliability of transmission of multibroadcast data between a source of data and a plurality of receivers of said data via a telecommunications network, noteworthy in that said supervision server is able to supply to each receiver a list comprising at least one other receiver, said list being used to set up a reliable peer-to-peer connection between said receiver and said other receiver. The list also includes a reference source that has the data.

The invention further relates to a reference source for a system for improving the reliability of transmission of multibroadcast data between a source of data and a plurality of receivers of said data via a telecommunications network, noteworthy in that said reference source has said data and is adapted to set up a reliable peer-to-peer connection with at least one receiver.

The invention further relates to a receiver in a system for improving the reliability of transmission of multibroadcast data between a source of data and a plurality of receivers of said data via a telecommunications network, noteworthy in that said receiver comprises means for verifying the integrity of data supplied by said other receiver during a peer-to-peer connection.

Finally, the invention relates to a system for improving the reliability of transmission of multibroadcast data between a source of data and a plurality of receivers ($20_1, 20_2, \ldots, 20_N$) of said data via a telecommunications network, said system comprising a supervision server adapted to provide each receiver with a list comprising at least one other receiver, said receiver being able to receive missing data from said other receiver via a reliable peer to peer connection.

The system also includes a reference source having said data and appearing in at least one list supplied by said supervision server.

In the system, each receiver comprises means for verifying the integrity of data supplied by said other receiver during a peer-to-peer connection.

In the system, said verification means comprise means for calculating hashes of fragments of data received from at least one other receiver and means for comparing the calculated hashes with hashes of said fragments received from said data source.

In the system, each receiver comprises means for verifying the integrity of hashes supplied by said other receiver during a peer-to-peer connection.

In the system, said hash integrity verification means use a Merkle hash tree.

In the system, the root of the Merkle hash tree is transmitted to said receivers before said data.

In the system, the data source is able to transmit the root of said Merkle hash tree to said receivers before said data by reliable multibroadcasting via said telecommunications network.

In the system, the data source is able to transmit hashes of lower level than said root to said receivers after said root and before said data.

In the system, the reliable peer-to-peer connection is set up by means of a TCP connection.

The invention claimed is:

1. A system for improving a reliability of transmission of multibroadcast data, the system comprising: a plurality of customer receivers coupled to a telecommunications network and configured to receive a transmission of the multibroadcast data via the telecommunications network, at least some of the plurality of customer receivers being peers of a peer-to-peer network; a supervision server coupled to the telecommunications network and being configured to provide each customer receiver with a list of at least one other customer receiver of the plurality of customer receivers, said provided customer receiver being configured to receive missing data of said multibroadcast data from said at least one other customer receiver of the list via a reliable peer-to-peer connection on the peer-to-peer network; and a multicast source of data adapted to transmit to said plurality of customer receivers, before the data, a root hash of a Merkle hash tree of said data by reliable multibroadcasting via said telecommunications network, said multicast source of data being adapted to transmit to the customer receivers hashes of lower level than said root hash after said root hash and before said data.

2. A system of providing a data multibroadcast to a plurality of customer receivers of said data via a telecommunications network, comprising: a source of data adapted to transmit to said customer receivers, before the data, the root hash of a Merkle hash tree of said data by reliable multibroadcasting via said telecommunications network, said source of data being adapted to transmit to the customer receivers hashes of lower level than said root hash after said root hash and before said data, a customer receiver being adapted to receive missing data from another customer receiver via a reliable peer-to-peer connection.

3. A system comprising:
a multicast source configured to transmit multicast data to a plurality of customer receivers of said data via a telecommunications network, the multicast source of data being configured to transmit to said plurality of customer receivers, before the data, a root hash of a Merkle hash tree of said data by reliable multibroadcasting via said telecommunications network, said multicast source of data being further configured to transmit to the customer receivers hashes of lower level than said root hash after said root hash and before said data, at least some of the plurality of customer receivers being peers of a peer-to-peer network; and
a supervision server coupled in the telecommunications network and configured to provide each customer receiver with a list of at least one other of the plurality of customer receivers, said list being configured to enable establishment of a reliable peer-to-peer connection between the customer receiver provided with the list and said other customer receiver.

4. A system for improving the reliability of transmission of multicast data comprising:
a plurality of customer receivers, which are coupled to receive multicast data via a telecommunications network;
a multicast source of data adapted to transmit to said plurality of customer receivers, before the data, a root hash of a Merkle hash tree of said data by reliable multibroadcasting via said telecommunications network, said multicast source of data being adapted to transmit to the customer receivers hashes of lower level than said root hash after said root hash and before said data; and
a reference source having said multicast data previously stored and being configured to establish a reliable peer-to-peer connection with at least one customer receiver and transmit at least a portion of said multicast data to the at least one receiver via the peer-to-peer network.

5. A system for improving the reliability of transmission of multicast data, the system comprising:
a customer receiver configured to receive the multicast data from a multicast source via a telecommunications system and to receive from the multicast source, before the data, a root hash of a Merkle hash tree of said data by reliable multibroadcasting via said telecommunications network, and to receive from the multicast source hashes of lower level than said root hash after said root hash and before said data, the customer receiver being further configured to receive missing data of said multicast data from another customer receiver of said multicast data via a peer-to-peer connection, the customer receiver including a verification unit configured to verify integrity of the missing data provided by said other customer receiver during the peer-to-peer connection.

6. The system according to claim 5, wherein said verification unit includes a calculation unit configured to calculate hashes of fragments of data received from at least one other customer receiver and a comparison unit configured to compare the calculated hashes with hashes of said fragments received from said source of data.

7. The system according to claim 6, wherein said verification unit is configured to verify the integrity of hashes provided by said other customer receiver during a peer-to-peer connection.

8. The system according to claim 7, wherein said verification unit uses the Merkle hash tree.

9. A method comprising:
transmitting multicast data from a multicast source to a plurality of customer receivers via a telecommunications network, comprising transmitting to said plurality of customer receivers, before the data, a root hash of a Merkle hash tree of said data by reliable multibroadcasting via said telecommunications network, and transmitting to the customer receivers hashes of lower level than said root hash after said root hash and before said data; and transmitting data missing from said multicast data in a first of said customer receivers from a second of the customer receivers to said first customer receiver a reliable peer-to-peer connection.

10. A non-transitory computer readable storage medium encoded with computer program instructions that when executed by a computer cause the computer to execute steps of the method according to claim 9.

11. A method comprising: receiving by a first customer receiver, among a plurality of customer receivers, multicast data transmitted by a multicast source via a telecommunications network, including receiving from the multicast source, before the data, a root hash of a Merkle hash tree of said data by reliable multibroadcasting via said telecommunications network, and receiving from the multicast source hashes of lower level than said root hash after said root hash and before said data; and receiving by said first customer receiver data missing from said multicast data from a second of the plurality customer receivers via a reliable peer-to-peer connection.

12. A non-transitory computer readable storage medium encoded with computer program instructions that when executed by a computer cause the computer to execute steps of the method according to claim 11.

13. A customer receiver comprising:
a non-transitory memory; and
a computer program stored in the non-transitory memory and comprising:
instructions configured to receive multicast data from multicast source via a telecommunications network, including receiving from the multicast source, before the data, a root hash of a Merkle hash tree of said data by reliable multibroadcasting via said telecommunications network, and receiving from the multicast source hashes of lower level than said root hash after said root hash and before said data; and
instructions configured to perform the following steps after the multicast data, except missing data, are received by the customer receiver:
requesting the missing data from a further customer receiver that also received the multicast data from the multicast source; and
receiving the missing data from the further customer receiver via a peer-to-peer connection.

\* \* \* \* \*

UNITED STATES PATENT AND TRADEMARK OFFICE
CERTIFICATE OF CORRECTION

PATENT NO. : 8,427,994 B2  
APPLICATION NO. : 12/162139  
DATED : April 23, 2013  
INVENTOR(S) : Dugoujon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this
Eighth Day of September, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,427,994 B2 | Page 1 of 1 |
| APPLICATION NO. | : 12/162139 | |
| DATED | : April 23, 2013 | |
| INVENTOR(S) | : Dugoujon et al. | |

It is certified that error appears in the above-identified patent and that said Letters Patent is hereby corrected as shown below:

ON THE TITLE PAGE

(57) Abstract

Line 7, after the word "from", delete the word "said".

Signed and Sealed this
Second Day of February, 2016

Michelle K. Lee
*Director of the United States Patent and Trademark Office*